United States Patent
Stall

(10) Patent No.: US 10,223,163 B2
(45) Date of Patent: Mar. 5, 2019

(54) WORKFLOW-BASED OBJECT DESTRUCTION

(71) Applicant: Microsoft Technology Licensing, LLC, Redmond, WA (US)

(72) Inventor: Jeffrey Evan Stall, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 201 days.

(21) Appl. No.: 15/210,864

(22) Filed: Jul. 14, 2016

(65) Prior Publication Data

US 2018/0018206 A1 Jan. 18, 2018

(51) Int. Cl.
*G06F 9/50* (2006.01)
*G06F 9/52* (2006.01)
*G06F 12/02* (2006.01)

(52) U.S. Cl.
CPC .............. *G06F 9/5022* (2013.01); *G06F 9/52* (2013.01); *G06F 12/0253* (2013.01); *G06F 12/0261* (2013.01); *G06F 12/0269* (2013.01); *G06F 12/0276* (2013.01)

(58) Field of Classification Search
None
See application file for complete search history.

(56) References Cited

U.S. PATENT DOCUMENTS

| | | | |
|---|---|---|---|
| 5,398,334 A | 3/1995 | Topka et al. | |
| 6,230,213 B1 | 5/2001 | Davidson | |
| 6,363,403 B1 * | 3/2002 | Roy | G06F 12/0261 |
| 6,473,773 B1 | 10/2002 | Cheng et al. | |
| 6,496,864 B1 | 12/2002 | McCartney | |
| 6,681,263 B1 | 1/2004 | King | |
| 7,237,237 B2 | 6/2007 | Foti | |

(Continued)

FOREIGN PATENT DOCUMENTS

WO 00/57277 A1 9/2000

OTHER PUBLICATIONS

"Component bslstl_sharedptr", Apr. 1, 2016, reprinted from the Internet at: http://bloomberg.github.io/bde/group_bslstl_sharedptr.html, 16 pgs.

(Continued)

*Primary Examiner* — Qing Yuan Wu
(74) *Attorney, Agent, or Firm* — Buckley, Maschoff & Talwalkar LLC

(57) ABSTRACT

Objects in a computing environment are often utilized by threads through an object lifecycle, and are destroyed at the end of the object lifecycle to reclaim the computing resources used by the object. In some cases, a thread that initiates an object destruction of an object may be unable to complete the destruction (e.g., a second thread may hold a synchronization lock over an object resource of the object). An object destruction workflow initiates the destruction of an object on behalf of a thread. If the object destruction workflow encounters a failure to complete the object destruction, a new reference to the object is inserted into an object destruction list, as the last reference to the object. A second thread discovers and releases the last reference in the object destruction list, prompting the object destruction workflow to resume the attempt to destroy the object on behalf of the second thread.

20 Claims, 10 Drawing Sheets

(56) References Cited

U.S. PATENT DOCUMENTS

| | | | |
|---|---|---|---|
| 7,376,683 | B1 | 5/2008 | Wolczko et al. |
| 2002/0087590 | A1* | 7/2002 | Bacon ............... G06F 12/0261 |
| 2005/0028140 | A1* | 2/2005 | Ayachitula ............ G06F 9/5016 |
| | | | 717/116 |
| 2007/0203960 | A1* | 8/2007 | Guo .................... G06F 12/0269 |
| 2012/0197944 | A1 | 8/2012 | Foti |
| 2013/0275941 | A1 | 10/2013 | Grundelius et al. |
| 2015/0269196 | A1 | 9/2015 | Hillberg et al. |

OTHER PUBLICATIONS

Brown, Neil, "Linux kernel design patterns—part 1", Published on: Jun. 8, 2009 Available at: https://lwn.net/Articles/336224/, 10 pgs.

Shure, Loren, "Considering Performance in Object-Oriented MATLAB Code", Published on: Mar. 26, 2012 Available at: http://blogs.mathworks.com/loren/2012/03/26/considering-performance-in-object-oriented-matlab-code/, 9 pgs.

Michael, Maged M., "Hazard Pointers: Safe Memory Reclamation for Lock-Free Objects", In Journal of IEEE Transactions on Parallel and Distributed Systems, vol. 15, Issue 6, Jun. 2004, pp. 491-504.

"IUnknown Release method", Retrieved on: Jul. 7, 2016 Available at: https://msdn.microsoft.com/en-us/library/windows/desktop/ms682317(v=vs.85).aspx, 2 pgs.

"IClosable interface", Retrieved on: Jul. 7, 2016 Available at: https://msdn.microsoft.com/en-us/library/windows/apps/windows.foundation.iclosable.aspx, 3 pgs.

"Composition Drawing Surface class", Retrieved on: Jul. 7, 2016 Available at: https://msdn.microsoft.com/en-us/library/windows/apps/windows.ui.composition.compositiondrawingsurface.aspx, 7 pgs.

"Critical Section Objects", Retrieved on: Jul. 7, 2016 Available at: https://msdn.microsoft.com/en-us/library/windows/desktop/ms682530(v=vs.85).aspx, 2 pgs.

"Single-Threaded Apartments", Retrieved on: Jul. 7, 2016 Available at: https://msdn.microsoft.com/en-us/library/windows/desktop/ms680112(v=vs.85).aspx, 3 pgs.

"Visual Collection Insert At Bottom method", Retrieved on: Jul. 7, 2016 Available at: https://msdn.microsoft.com/en-us/library/windows/apps/windows.ui.composition.visualcollection.insertatbottom.aspx, 2 pgs.

"COM Callable Wrapper", Retrieved on: Jul. 7, 2016 Available at: https://msdn.microsoft.com/en-us/library/f07c8z1c(v=vs.110).aspx, 5 pgs.

"Interlocked Increment function", Retrieved on: Jul. 7, 2016 Available at: https://msdn.microsoft.com/en-us/library/windows/desktop/ms683614(v=vs.85).aspx, 2 pgs.

"IUnknown interface", Retrieved on: Jul. 7, 2016 Available at: https://msdn.microsoft.com/en-us/library/windows/desktop/ms680509(v=vs.85).aspx, 2 pgs.

"IDisposable Interface", Retrieved on: Jul. 7, 2016 Available at: https://msdn.microsoft.com/en-us/library/system.idisposable.aspx, 9 pgs.

Int. Search Report/Written Opinion cited in PCT Application No. PCT/US2017/040570 dated Sep. 29, 2017, 13 pgs.

* cited by examiner

WORKFLOW-BASED OBJECT DESTRUCTION

BACKGROUND

Within the field of computing, many scenarios involve a device storing a set of objects, which typically comprise a set of object resources, such as functions, primitive data types, references to other objects, and data containers such as arrays, hashtables, and trees. Various threads executing within one or more execution environments (e.g., utilizing different programming languages, execution domains, and/or platforms) may create and access the objects, including storing references (e.g., memory addresses or handles) to the objects that are currently in use by the respective threads. An object may be concurrently and/or consecutively accessed by several threads and/or objects, and a reference counter may be used to track the number of references to each object that are held by the threads and stored in other objects. In some instances, concurrent access over a particular shared resource may be achieved through a synchronization mechanism that ensures exclusive access to the object resource by one thread at any one time. The synchronization mechanism, such as a mutex, a semaphore, or a critical section, may triage pending requests; may grant exclusive access over the object resource to a selected thread, while denying other requesting threads access to the object; and may await a completion of the access by the selected thread before transferring exclusive access to a second thread with a pending access request.

When a thread completes its use of an object, it releases its reference (implicitly or explicitly), and the reference count is decremented by one. When the reference count for an object is reduced to zero, the object is deemed to be no longer in use and ready for destruction. The device may finalize the object resources of the object, and may reclaim the memory and computing resources that were reserved and/or consumed by the object. Alternatively, a thread may explicitly request a disposal of an object, and the device may initiate the finalization process, which may include altering any existing references to the object that are held by other threads and/or other objects.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

When a thread endeavors to destroy an object, some circumstances may arise that prevent the thread from completing the object destruction process. As a first such example, the object may include an object resource that was created by a second thread within a different execution environment, where the process for destroying the object resource according to the conventions of the different execution environment may not be fully available to the initiating thread. As a second such example, the object may include an object resource that is exclusively reserved for use by a second thread, such as a synchronization lock, and the first thread may be unable to interrupt the exclusive access provided to the second thread without corrupting the second thread or inducing unanticipated behavior of the device. As a third such example, the object may include an object resource that is currently busy (e.g., a resource handle over a resource that may take a while to release), and blocking the thread until the object resource becomes available for destruction may impose and indeterminate delay upon the thread.

When such circumstances arise, a thread may initiate the destruction of the object but may be unable to complete the object destruction process. The thread may simply abort the process, but this may leave the object in an inconsistent state, and/or the partially-destroyed object may persist indefinitely as a resource leak. The thread may endeavor to destroy the object at a later time, but if some tasks cannot be performed by the thread irrespective of any time, the repeated trial of the thread may represent a consistent and unproductive resource drain upon the device. Moreover, in some cases, the destruction of the object may require the participation of several threads (e.g., different threads may hold exclusive access over different portions of the object), such that no one thread may initiate and also complete the object destruction process. In these circumstances, the inability of the thread to complete the object destruction process may be difficult to resolve in an uncoordinated trial-and-error manner, absent a more coordinated object destruction process in which various threads may participate.

In view of these circumstances, the present disclosure provides techniques that facilitate the object destruction of objects by threads, particularly (though not exclusively) in a reference-counting environment. In accordance with these techniques, the process of destroying an object may be handled by an object destruction workflow. A thread may invoke the object destruction workflow with a request to destroy the object (e.g., responsive to the thread decrementing the reference count over the object to zero), and may invoke the object destruction workflow to initiate the object destruction. The object destruction workflow may perform the tasks of the object destruction process for this particular object (e.g., destroying object resources embedded in the object; reclaiming memory and other computational resources; and releasing any remaining references to the object held by other threads and objects). The object destruction workflow may also verify that the requesting thread is permitted to perform each task of the object destruction process. If the object destruction completes, the object destruction workflow may notify the initiating thread that the request was completely fulfilled. However, if the object destruction process fails (e.g., because the initiating thread is restricted from performing at least one task of the object destruction process), the object destruction workflow may create a new reference to the object, and add the new reference to an object destruction list. Because the new reference represents a last reference to the object, the object destruction workflow may increment the reference count of the object from zero to one, indicating that the object is currently retained according to reference-counting semantics. The object destruction process may then notify the first thread of the failure to complete the object destruction of the object.

At a later time, the same thread, or a different thread that has also utilized the object, may discover the existence of the last reference to the object in the object destruction list. The last reference may be released to decrement the reference count over the object from one to zero, prompting the object destruction workflow to resume the object destruction process on behalf of the requesting thread. The second request (at a later time and/or by a different thread) may enable the object destruction workflow to complete the object destruction process, thereby fully releasing the object resources of the object, and prompting the object destruction workflow to notify the requesting thread of the completion of the object destruction. In this manner, the object destruction workflow may handle various complexities of the object destruction process, and may encapsulate a workflow-based object destruction process that enables threads to coordinate and interoperate to achieve the complete destruction of the object, in accordance with the techniques presented herein.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
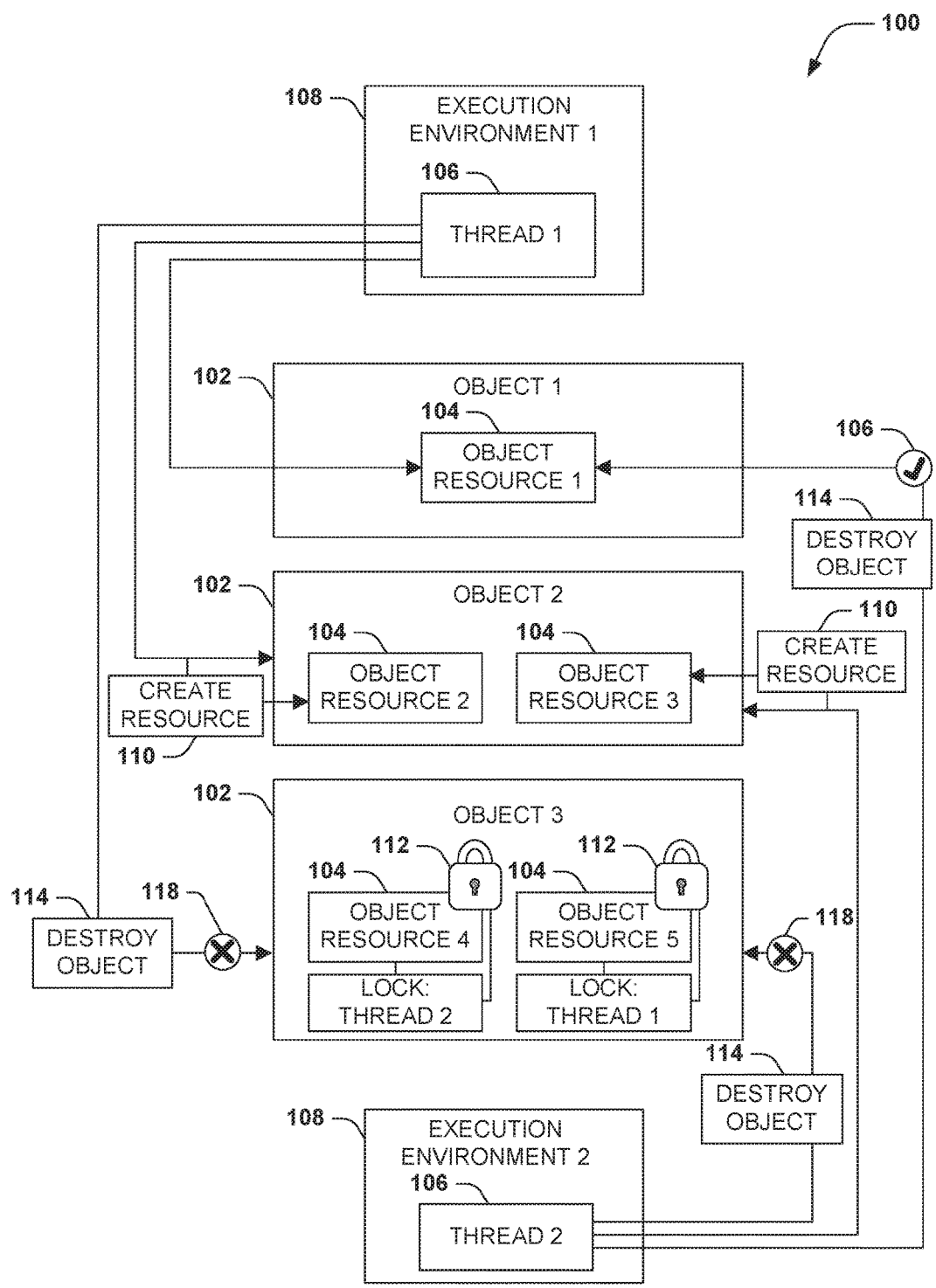
FIG. 1 is an illustration of an example scenario featuring a set of threads that share access to, and endeavor to destroy, a set of objects.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A. Introduction

FIG. 1 is an illustration of an example scenario 100 in which a set of objects 102 is accessed by a set of threads 106 within a computing environment, where the threads 106 endeavor to destroy the objects 102 after use.

In this example scenario 100, a first thread 106 executes within a first execution environment 108 (e.g., a C application compiled for and natively executed by the device), and a second thread 106 executes within a second, different execution environment 108 (e.g., a .NET application executed by a .NET execution engine). The respective threads 106 may create and access various objects 102 that respectively store a set of object resources 104, such as primitive data types; references to other objects 102; and/or data structures, such as functions, lists, hashtables, and trees, that contain other data and/or references to other objects 102. The threads 106 may participate in the creation and updating of the objects 102, such as resource creation requests 110 to create an object resource within an object 102.

As further shown in the example scenario 100 of FIG. 1, the threads 106 may also share access to respective objects 102. For example, within a first object 102, a first object resource 104 may be created by the first thread 106, and may be accessed and/or updated by the second thread 106. In some cases, the sharing may occur without restriction, such as an object resource 104 that is freely and concurrently accessible to any number of threads 106. However, in other circumstances, the sharing may involve a synchronization mechanism, such as an object resource lock 112 that grants exclusive access over the object resource 104 to a particular thread 106. The object resource lock 112 may deny access to the object resource 104 by any other threads 106 for the duration that the exclusively authorized thread 106 retains the object resource lock 112, and may record such unfulfilled access requests by other threads 106, optionally blocking the execution of such other threads 106 until such access can be granted. When such thread 106 completes the exclusive access and releases the object resource lock 112, a component of the computing environment (e.g., a synchronization lock manager) may review a list of pending requests to access the object resource 104, may choose one of the pending requests (e.g., according to a priority order), and may notify the thread that initiated the selected request of the grant of the object resource lock 112 (optionally unblocking the thread 106 during the pendency of the request).

Within such scenarios, the threads 106 may retain the respective objects 102 during the useful lifecycle of the objects. At the completion of the lifecycle of a particular object 102, a thread 106 may seek to destroy the object 102 in order to reclaim the computational resources utilized thereby, such as system memory, storage space in a cache or secondary memory, and processor usage. The object destruction process may be triggered explicitly (e.g., a thread 106 may invoke a Dispose operation on an object 102) or implicitly (e.g., a thread 106 may store the only reference to an object 102, and the portion of code that utilizes the reference may go out of scope, resulting in an object 102 with no remaining references). The object destruction process invoked by the thread 106 may involve destroying each of the object resources 104 comprising the object 102, and then destroying an object container of the object 102.

Additionally, some circumstances may permit an object 102 that was created by a first thread 106, and that is shared between the first thread 106 and a second thread 106, to be destroyed by either the first thread 106 or the second thread 106. For example, in the example scenario 100 of FIG. 1, the first thread 106 may create a first object 102 and a first object resource 104 contained therein, and the second thread 106 may initiate an object destruction request 114 to destroy the object 102. The request may be fulfilled by destroying the object resource 104 and then destroying the object 102, and the successful completion of the object destruction may be indicated to the second thread 106 that invoked the object destruction request 114 via a return value that indicates a success 206. The destruction of the object 102 by either thread 106 may therefore affect the other thread 106 that is also accessing the object 102 in a shared manner. In such circumstances, the computing environment may either deny the request of the first thread 106 to destroy the object 102, or may fulfill the request by resetting the references to the object 102 held by the second thread 106 to a default or null value, thereby enabling the second thread 106 to avoid an invalid memory reference exception. In this manner, the threads 106 may interoperate to share access to the objects 102 and the object resources 104 contained therein, and a thread 106 may initiate and complete an object destruction process for the respective objects 102 at the completion of an object lifecycle.

However, in such circumstances, a particular thread 106 that initiates an object destruction request 114 may be unable to complete the object destruction process, for a variety of reasons.

As a first such example, an object 102 may include object resources 104 that were respectively created within different execution environments 108, each of which may utilize a particular convention for creating, as well as destroying, object resources 104 of respective objects. In such circumstances, a thread 106 executing within a particular execution environment 108 may be unaware of and/or unable to invoke the object resource destruction process that is utilized by a different execution environment 108 that created the object resource 104. For example, in the example scenario 100 of FIG. 1, the second object 102 includes a third object resource 104 that was created by a resource creation request 110 of the first thread 106 executing within the first execution environment 108, and also a fourth object resource 104 that was created by a resource creation request 110 of the second thread 106 executing within the second execution environment 108. The first thread 106 (e.g., a C native process) may be unable to initiate the destruction of the fourth object resource 104 (which was created by the .NET execution engine); similarly, the second thread 106 (e.g., a C# managed process) may be unable to initiate the destruction of the third object resource 104 (which was created by the C native process). Accordingly, neither thread 106 may be capable of both initiating and completing the destruction of the second object 102, and any object destruction request 114 initiated by either thread 106 may result in a failure 118.

As a second such example, an object resource 104 of an object 102 may be exclusively utilized by a second thread 106 that holds an object resource lock 112, and a first thread 106 that initiates a request to destroy the object 102 may not be permitted to destroy the object resource 104, and hence the object 102, until the second thread 106 completes its exclusive access and relinquishes the object resource lock 112. Moreover, as shown in the example scenario 100 of FIG. 1, the third object 102 contains a fifth object resource 104 for which the second thread 106 holds a first object resource lock 112, and also a sixth object resource 104 for which the first thread 106 holds a second object resource lock 112. In this case, neither thread 106 is capable, by itself, of both initiating and completing an object destruction request 114, and any such request may result in a failure 118.

Still other circumstances may arise that obstruct the completion of an object destruction of an object 102 by a particular thread 106 As a third example, an object resource 104 may have particular prerequisite criteria to be fulfilled before the object resource 104 is destroyed, such as first destroying a second object resource 104 of the same object 102 or a different object 102; concurrently destroying a second object resource 104 of the object 102; and/or only permitting a particular thread 106 (e.g., a thread 106 that serves as a manager of the object resource 104) to invoke the destruction of the object resource 104. As a fourth example, the object 102 and/or object resource 104 may be involved in a cyclic object graph, comprising a set of objects 104 that reference one another other in a cyclic manner, and wherein each object 102 may be destroyed only after the other objects 102 are destroyed. Absent a recognition of this circumstance, the cyclic object graph may lead to an impasse that precludes the destruction of any of the objects 102. As a fifth example, an object resource 104 may simply be busy; e.g., an object resource 104 may comprise a handle over an external device that is performing an uninterruptible process, wherein destroying the object resource 104 prior to completion of the uninterruptible process may corrupt the external device. While it may be feasible for the thread 106 initiating the object destruction request 114 for such an object 102 to block until the object resource 104 is available for destruction, such blocking may cause the thread 106 to become unresponsive, possibly for an extended and possibly indeterminate duration.

In such circumstances, the inability of a thread 106 to complete an object destruction request 114 over an object 102 may be unanticipated, such that an error or unhandled exception causes the thread 106 to become unresponsive, crash, or engage in unanticipated behavior. In some cases, when a thread 106 encounters an obstacle while processing an object destruction request 114, the thread 106 may abandon the destruction task. However, if the computing environment lacks any mechanism for resuming and potentially completing the object destruction of the object 102, the object 102 may persist indefinitely as a resource leak that consumes computing resources such as memory and processor cycles without productive effect. Moreover, when a thread 106 partially destroys an object 102 and then aborts the destruction due to an obstacle, the object 102 may be left in an inconsistent and indeterminate state, wherein some resources consumed by the object 102 may be not satisfy an implicit model such for resource usage. For example, the computing environment may track network usage according to the threads 106 that reference the objects 102 wherein network handles are stored and utilized. However, the computing environment may not anticipate the circumstance of an object 102 that utilizes the network but is not referenced by any thread 106, and such an unexpected result may create unanticipated behavior in other threads 106 of the computing environment, such as an unidentifiable and potentially interminable consumption of network capacity. In still other cases, a thread 106 may be prepared to handle an inability to complete the destruction of an object 102, but may be unable to determine why the object destruction of the object 102 failed, nor any proper mechanism to continue the object destruction process. For example, the thread 106 may recognize that some other thread 106 is responsible for destroying a particular object resource 104 of an object 102, but may be incapable of identifying and/or notifying any such other thread 106 of the object destruction request 114. As yet another potential disadvantage, in some circumstances, the prerequisite criteria of destroying the object resources 104 of an object 102 may be complex and nuanced, such that configuring any particular thread 106 to handle the complexities of the object destruction process for any particular object 102 may delegate an undesirable amount of complexity for a developer of the thread 106. Moreover, the criteria that might pertain to the destruction of an object resource 104 may evolve over time (e.g., a new criterion may be defined according to newly implemented environmental mechanisms of the computing environment), imposing a significant and potentially prohibitive development burden upon the developer of a particular thread 106. These and other complications may arise in the context of an object destruction request 114 of a thread 106 over the object resources 104 of an object 102.

B. Presented Techniques

In view of the complexities of object destruction of objects 102, including those illustrated in the example scenario 100 of FIG. 1, the present disclosure provides techniques for facilitating threads 106 in the destruction of objects 102, and in particular addresses scenarios in which a first thread 106 initiates an object destruction request 114 but is unable to complete the object destruction of the object 102. These techniques involve the representation of the object destruction process as an object destruction workflow, which encapsulates and performs the tasks of object destruction of a particular object 102 on behalf of various threads 102.

Figure 2:
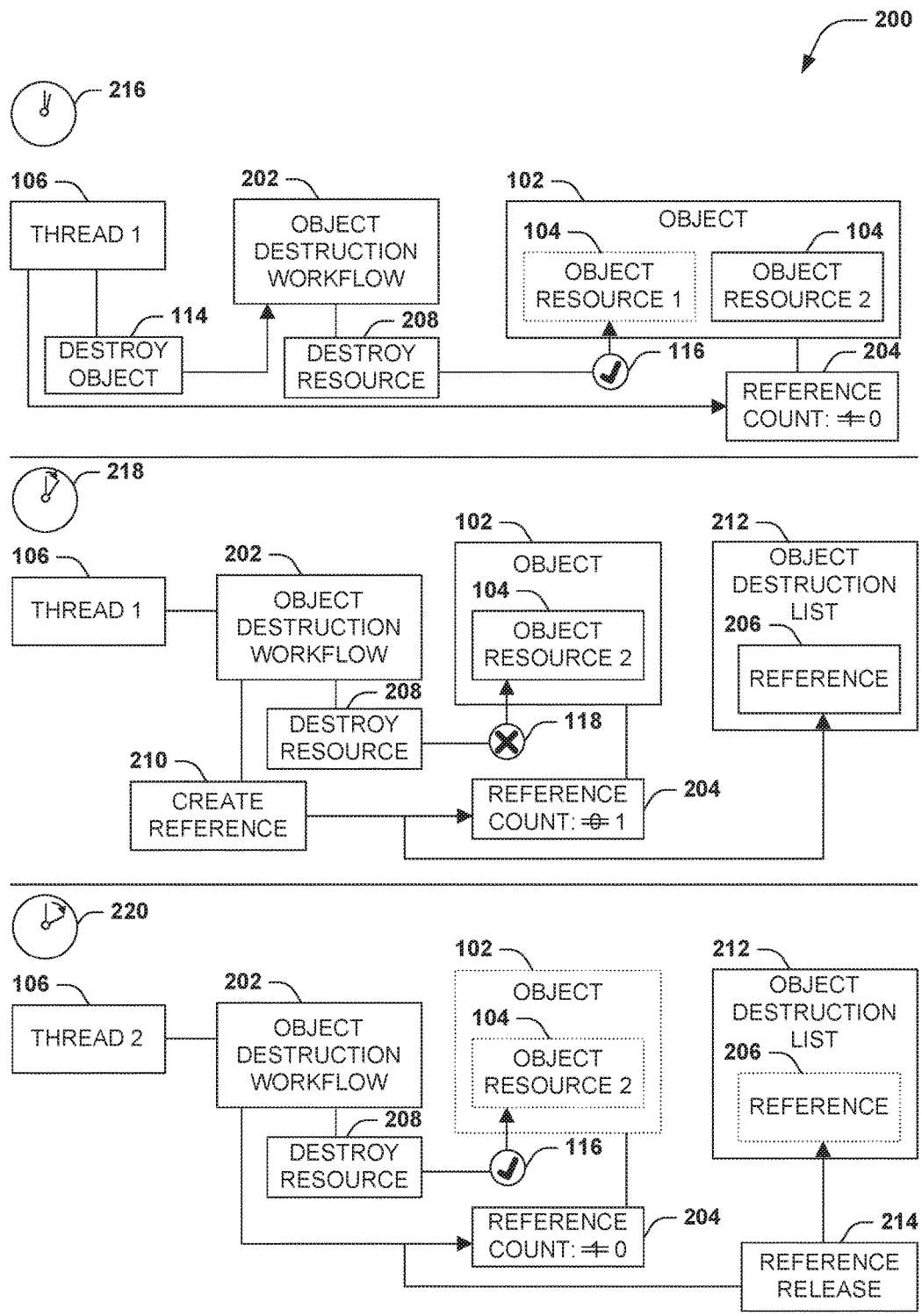
FIG. 2 is an illustration of an example scenario featuring a set of threads that destroy objects through an object destruction workflow in accordance with the techniques presented herein.

FIG. 2 is an illustration of an example scenario 200 presenting an object destruction workflow 202 that destroys an object 102 in accordance with the techniques presented herein. In this example scenario 200, at a first time 216, a first thread 106 initiates an object destruction request 114 to destroy an object 102 comprising two object resources 104. In this particular example, the object destruction is initiated when the first thread 106 releases a reference to the object 102 that happens to be the last reference 206 to the object 102. Releasing the reference 206 causes a reference count 204 of references 206 to the object 102 to decrement from one to zero, indicating that because no threads 106 in the computing environment have retained a reference 206, the object 102 has reached the end of the object lifecycle and is ready to be destroyed. Accordingly, the first thread 106 initiates the destruction of the object 102 responsive to decrementing the reference count 204 to zero. However, rather than endeavoring to perform the object destruction on its own, the thread 106 submits the object destruction request 114 to an object destruction workflow 202, which initiates the destruction of the object 102 on behalf of the thread 106. The object destruction workflow 202 begins by initiating an object resource destruction 208 for the first object resource 104, which produces a success 116.

As further illustrated in the example scenario 200 of FIG. 2, at a second time 218, the object destruction workflow 202 may continue the destruction of the object 102 on behalf of the first thread 106 by initiating an object resource destruction 208 of the second object resource 104, but may encounter a failure 118. For example, the second object resource 104 may be exclusively accessed by a different thread 106 holding an object resource lock 112; may have been created by a different thread 106 within a different execution environment 108 that uses different and potentially unknown object resource destruction processes; and/or may simply be busy, such as waiting on uninterruptible processes by other resources or devices. Responsive to encountering the failure 118, the object destruction workflow 202 may initiate a reference creation 210 of a new reference 206 to the object 102, and add the new reference 206 to an object destruction list 212. The object destruction list 212 comprises a store of last references 206 to objects 102 that are in the process of being destroyed (and, more specifically, objects 102 for which an object destruction process was previously initiated by the object destruction workflow 202 on behalf of at least one thread 106, but where an obstacle prevented the object destruction workflow 202 from completing the object destruction request 114). The new reference 204, now comprising the last reference 206 to the object 102, is inserted by the object destruction workflow 202 into the object destruction list 212, and the object destruction workflow increments the reference count 204 of the object 102 from zero to one. The object destruction workflow 202 may also report the failure 118 to the first thread 106, which may resume execution as if the object 102 had been fully destroyed.

As further illustrated in the example scenario 200 of FIG. 2, at a third time 220, a second thread 106 may discover and/or be notified of the last reference 206 to the object 102 in the object destruction list 212. The second thread 106 may have previously accessed the object 102 (or may even have created the object 102), and may therefore initiate a reference release 214 of the reference 206. The reference release 214 causes the reference count 202 to decrement from one to zero, which reinitiates the object destruction request 114 by the object destruction workflow 202, but at this third time 220, on behalf of the second thread 106 instead of the first thread 106. The object destruction workflow 202 may again initiate an object resource destruction 208 of the second object resource 104 of the object 102, and this attempt may produce a success 116 (e.g., because the object destruction workflow 202 is permitted to destroy the object resource 104 on behalf of the second thread 106, but not the first thread 106). Having completed the object destruction of the object 102, the object destruction workflow 202 may report a success 106 to the second thread 106. In this manner, the object destruction workflow 202 achieves an object destruction of the object 102 through an iterative process involving the cooperation of both threads 106 in accordance with the techniques presented herein.

C. Technical Effects

Various uses of the techniques presented herein for may result in a variety of technical effects.

A first technical effect that is achievable according to the techniques presented herein involves the successful destruction of an object 102 according to an object destruction workflow 202. The object destruction workflow 202 provides an iterative object destruction process that may involve the cooperation of multiple threads 106, and/or one thread 106 at two or more successive times, as an incremental process of destroying the object resources 104 of the object 102. Such an iterative process may enable a traversal of a wide range of potential obstacles to the initiation and completion of an object destruction by a single thread 106 in a single pass, and may reduce the incidence of exceptions, thread blockage, aborted object deletion that results in a partially deleted object 102 in an inconsistent state, resource leaks caused by incompletely deleted objects 102, unexpected behavior of the threads 106 and/or the computing environment due to inconsistent and possibly leaked objects 102, the interruption of uninterruptible processes, and gridlock scenarios wherein no single thread 106 is capable of destroying the object 102 without the cooperation of other threads 106.

A second technical effect that is achievable according to the techniques presented herein involves the utilization, by the object destruction workflow 202, of preexisting resources of the computing environment in the object destruction process, including reference counting techniques that may already be available within the computing environment, and the automated semantics of initiating the object destruction upon the reference count 204 of an object 102 being decremented to zero. Additionally, the use of the object destruction list 212, as a store of references 206 to objects 102 that are ready to be destroyed (and for which a previous attempt by the object destruction workflow 202 to destroy the object 102 on behalf of one or more threads 106 resulted in a failure 118), serves as a coordinating mechanism among the threads 106; e.g., the presence of a reference 206 in the object destruction list 212 serves as a tacit request for the threads 106 of the computing environment to attempt to destroy the object 102, and attempts by each such thread 106 may eventually result in a success 116 that completes, or at least progresses, the destruction of the object 102. Accordingly, threads that are already configured to utilize references 206 may be capable of participating in the incremental object destruction process mediated by the object destruction workflow 202, without reconfiguration or any awareness by the developer of the semantics and mechanics of such techniques.

A third technical effect that is achievable according to the techniques presented herein involves a reduction of development complexity on behalf of the threads 106 in handling object destruction. Delegation of the details and mechanics of object destruction from the threads 106 to the object destruction workflow 202 enables the threads 106 to disregard the progress and complexities of the object destruction process; e.g., the threads 106 need not be configured to handle failures 118, the various reasons therefor, and/or the communication of requests to other threads 106 to make a further attempt to destroy the object 102. The object destruction workflow 202 may even automate the process of reinitiating the destruction of the object 102 by the same thread 106 at a later time, rather than the thread 106 bearing the responsibility of reinitiating the attempt later. Each thread 106 may be configured simply to initiate the object destruction request 114, and then continue processing before the object destruction has completed, and even irrespective of the result of the initial object destruction request 114. The object destruction workflow 202 therefore facilitates the efficiency of the threads 106 by reducing thread blockage and/or complexity in participating in the object destruction process, and enabling the threads 106 to resume productive processing while the object destruction is elsewhere handled.

A fourth technical effect that is achievable according to the techniques presented herein involves a sophistication of the object destruction process. By encapsulating the details of the object destruction, the object destruction workflow 202 may be configured to handle a wide variety of objects 102 and object resources 104 to be destroyed; a wide variety of circumstances that may complicate the destruction thereof; and a wide variety of techniques to facilitate the handling of particular types and circumstances of the objects 102 and object resources 104.

Figure 3:
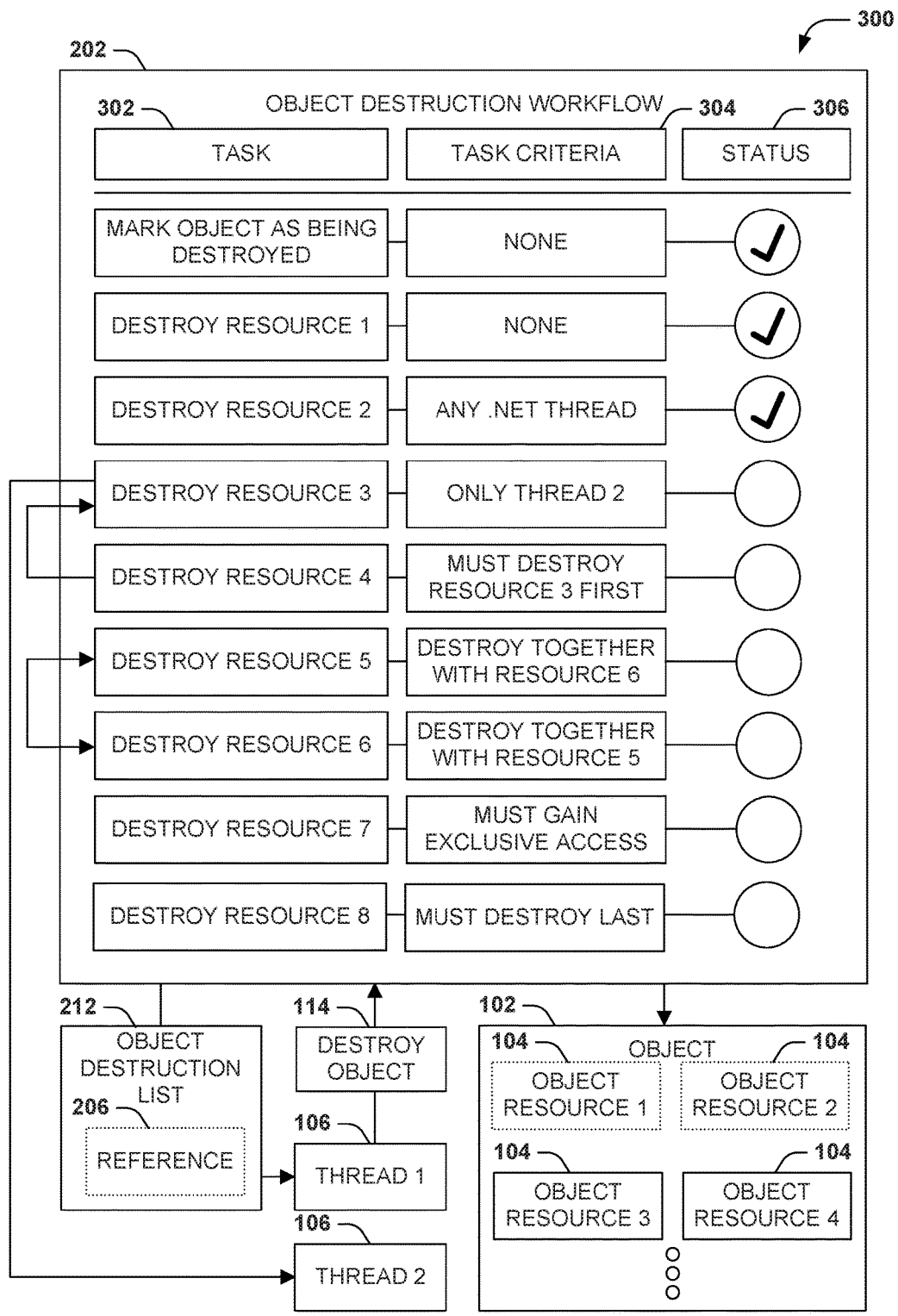
FIG. 3 is an illustration of an example object destruction workflow that facilitates the destruction of an object on behalf of a set of threads in accordance with the techniques presented herein.

FIG. 3 is an illustration of an example scenario 300 featuring an example object destruction workflow 202. In this example scenario 300, the object destruction workflow 202 is formulated for the object destruction, on behalf of two threads 106, of a particular object 102 featuring a robust set of object resources 104. The example object destruction workflow 202 is represented as a set of tasks 302 to be performed on the object 102, such as marking the object 102 as pending destruction, and of destroying particular resources 102. Moreover, the respective tasks 302 are associated with one or more task criteria 304, such as one or more prerequisites to be satisfied before initiating the task 302 (e.g., a prerequisite of having first completed the destruction of another object resources 104), and/or circumstances in which the task 302 may be performed (e.g., an identification of the types of threads 106 on behalf of which the object destruction workflow 202 may perform the task 302, and/or the identification of a second object resource 104 that is to be destroyed concurrently with a first object resource 104). The object destruction workflow 202 may also comprise a set of status indicators 306 of the respective tasks 302 indicating whether or not the task 302 has been completed. Some tasks 302 of the object destruction workflow 202 may be performed concurrently with other tasks 302 and/or in any sequential order (e.g., the destruction of the first object resource 104 and the second object resource 104 may be performed concurrently, and/or in either sequential order), while other tasks 302 may specify criteria 304 that enforce a particular sequential order and/or concurrency.

When a particular thread 106 decrements the reference count 204 of the object 102 from one to zero, the thread 106 may initiate an object destruction request 114. The object destruction workflow 202 may respond by examining the list of tasks 302, as well as the respective the task criteria 304 and status indicators 306, to identify one or more tasks 302 that are eligible to be performed on behalf of the thread 106. The object destruction workflow 202 may then perform the identified tasks 302 on behalf of the thread 106 either until the tasks 302 are complete (such that the object destruction is a success 116), or until no further tasks 302 are eligible to be performed on behalf of this thread 106, at which point the object destruction workflow 202 inserts a new reference 206 to the object 102 (as the last reference 206) into the object destruction list 212, as a mechanism for resuming the object destruction of the object 102 at a later time and possibly on behalf of a different thread 106. In this manner, the object destruction workflow 202 may enable and comply with a robust set of tasks 302 and task criteria 304 in the destruction of the object resources 104 and the object 102. Many such technical effects may be achievable by the destruction of objects 102 using an object destruction workflow 202 in accordance with the techniques presented herein.

D. Example Embodiments

Figure 4:
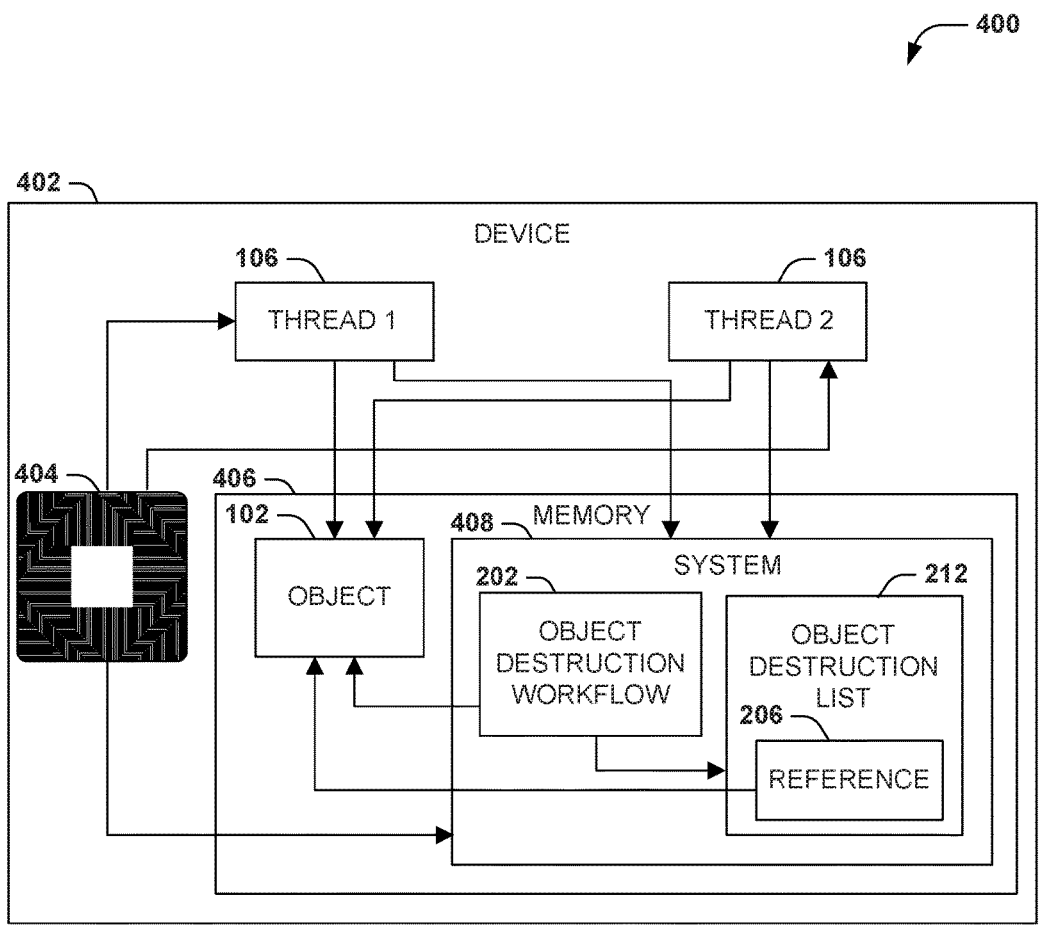
FIG. 4 is an example scenario featuring an example device utilizing an example system that destroys an object using an object destruction workflow in accordance with the techniques presented herein.

FIG. 4 presents an illustration of an example scenario 400 featuring an example embodiment of the techniques presented herein, illustrated as an example device 402 that destroys objects 102 in accordance with the techniques presented herein. In this example scenario 400, the device 402 comprises a processor 404, which executes a set of threads 106, e.g., on behalf of various applications and/or the computing environment of the device 302. The device 402 further comprises a memory 406 storing instructions that, when executed by the processor 404, implement an example system 408 that destroys objects 102 on behalf of the threads 106 according to the techniques presented herein.

The example system 408 comprises an object destruction list 212, which stores references 206 to objects 102 to be destroyed (and, more specifically, to objects 102 for which object destruction is pending, following at least one previous attempt to destroy the object 102 on behalf of at least one thread 106 that resulted in a failure 118). The example system 408 further comprises an object destruction workflow 202, which is executed by the processor 304 on behalf of a first thread 106. The object destruction workflow 202 responds to releasing a last reference 206 to the object 102 (e.g., decrementing a reference count 204 from one to zero) by attempting to destroy the object 102 (e.g., by performing various tasks 302, such as destroying individual object resources 104 of the object 102). Responsive to a failure 118 to complete the object destruction of the object 102, the object destruction workflow 202 adds a new reference 206 to the object 102 to the object destruction list 212, wherein the new reference 206 represents the last reference 206 to the object 102. Creating the new reference 206 may also prompt an incrementing of a reference count 204 of references 206 to the object 102 from zero to one. Moreover, the object destruction workflow 202 responds to the identification in the object destruction list 212 of a last reference 206 to the object 102, on behalf of the first thread 106, added on behalf of a second thread 106, by releasing the last reference 206 to the object 102. Such releasing in turn invokes the object destruction workflow 202 with an object destruction request 114 of the object 102, on behalf of the first thread 106, which may result in a success 116 (or at least progression) of the object destruction of the object 102. In this manner, the example device 402 and example system 406 of FIG. 4 facilitate the threads 106 in the destruction of objects 102 using an object destruction workflow 202 in accordance with the techniques presented herein.

Figure 5:
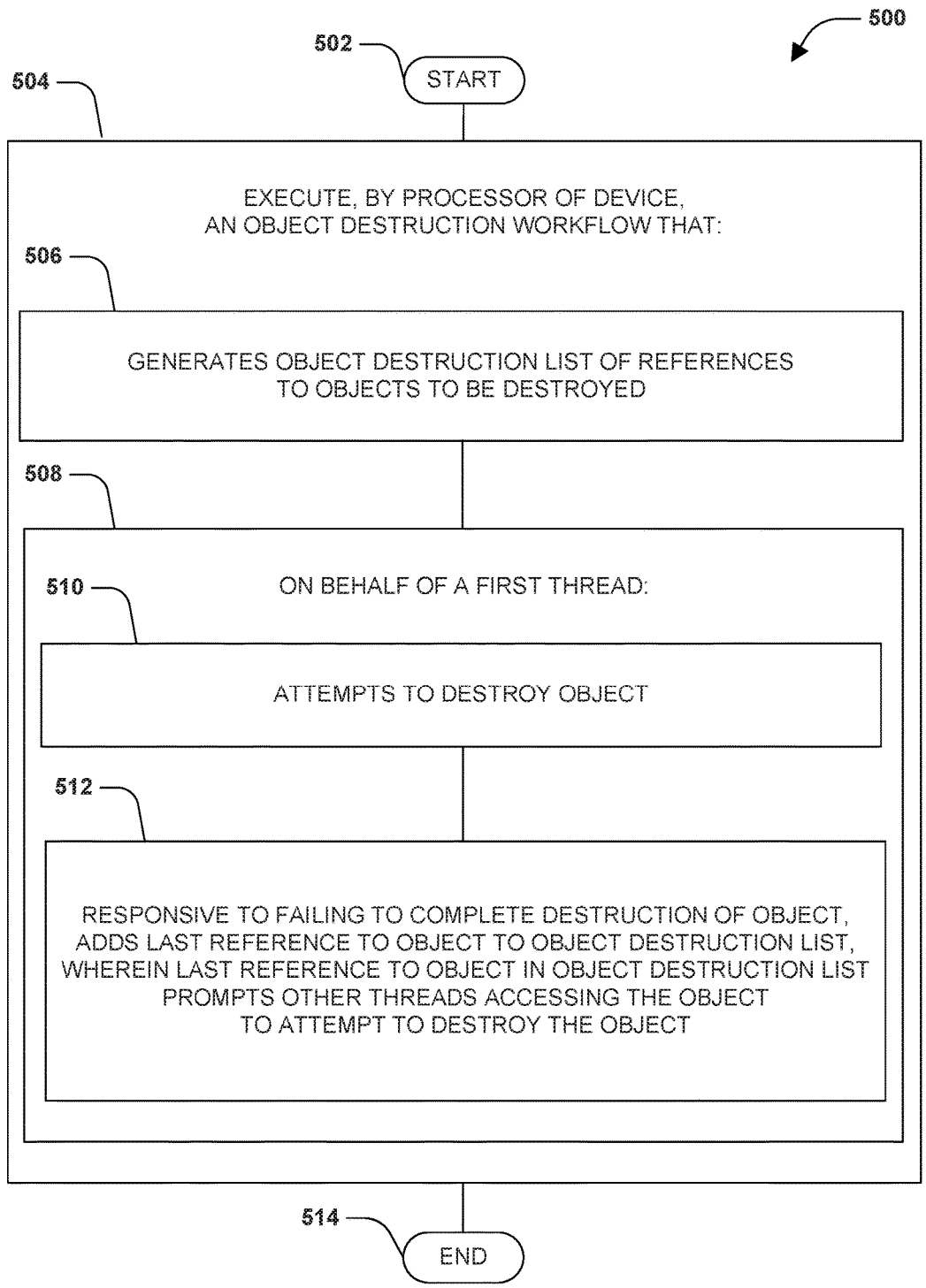
FIG. 5 is an example method of destroying an object on behalf of a thread using an object destruction workflow in accordance with the techniques presented herein.

FIG. 5 is an illustration of an example method 500 of destroying objects 102 on behalf of threads 106 through the use of an object destruction workflow 202, in accordance with the techniques presented herein. The example method 500 involves a device comprising a processor 404, and may be implemented, e.g., as a set of instructions stored in a memory component of a device, such as a memory circuit, a platter of a hard disk drive, a solid-state storage device, or a magnetic or optical disc, and organized such that, when executed on a processor of the device, cause the device to operate according to the techniques presented herein.

The example method 500 begins at 502 and involves executing 504 the object destruction workflow 202 on the processor 404 of the device. Specifically, execution of the object destruction workflow 202 generates 506 an object destruction list 212, which stores references 206 to objects 102 to be destroyed. Execution of the object destruction workflow 202, on behalf 508 of a first thread 106 and responsive to releasing a last reference 206 to an object 102 accessed by the first thread 106, further attempts 510 to destroy the object 102; and responsive to a failure 118 to complete the destruction of the object 102, further adds 512 a new reference 206 to the object 102 to the object destruction list 212 as the last reference 206 to the object 102, wherein the inclusion of the last reference 206 to the object 102 in the object destruction list 212 prompts other threads 106 (optionally including the first thread 106) to attempt to destroy the object 102. Having achieved the object destruction of the object 102 on behalf of the threads 102, the example method 500 implements the object destruction workflow 202 and the object destruction list 212 in accordance with the techniques presented herein, and so ends at 514.

Still another embodiment involves a computer-readable medium comprising processor-executable instructions configured to apply the techniques presented herein. Such computer-readable media may include various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein. Such computer-readable media may also include (as a class of technologies that excludes communications media) computer-computer-readable memory devices, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein.

Figure 6:
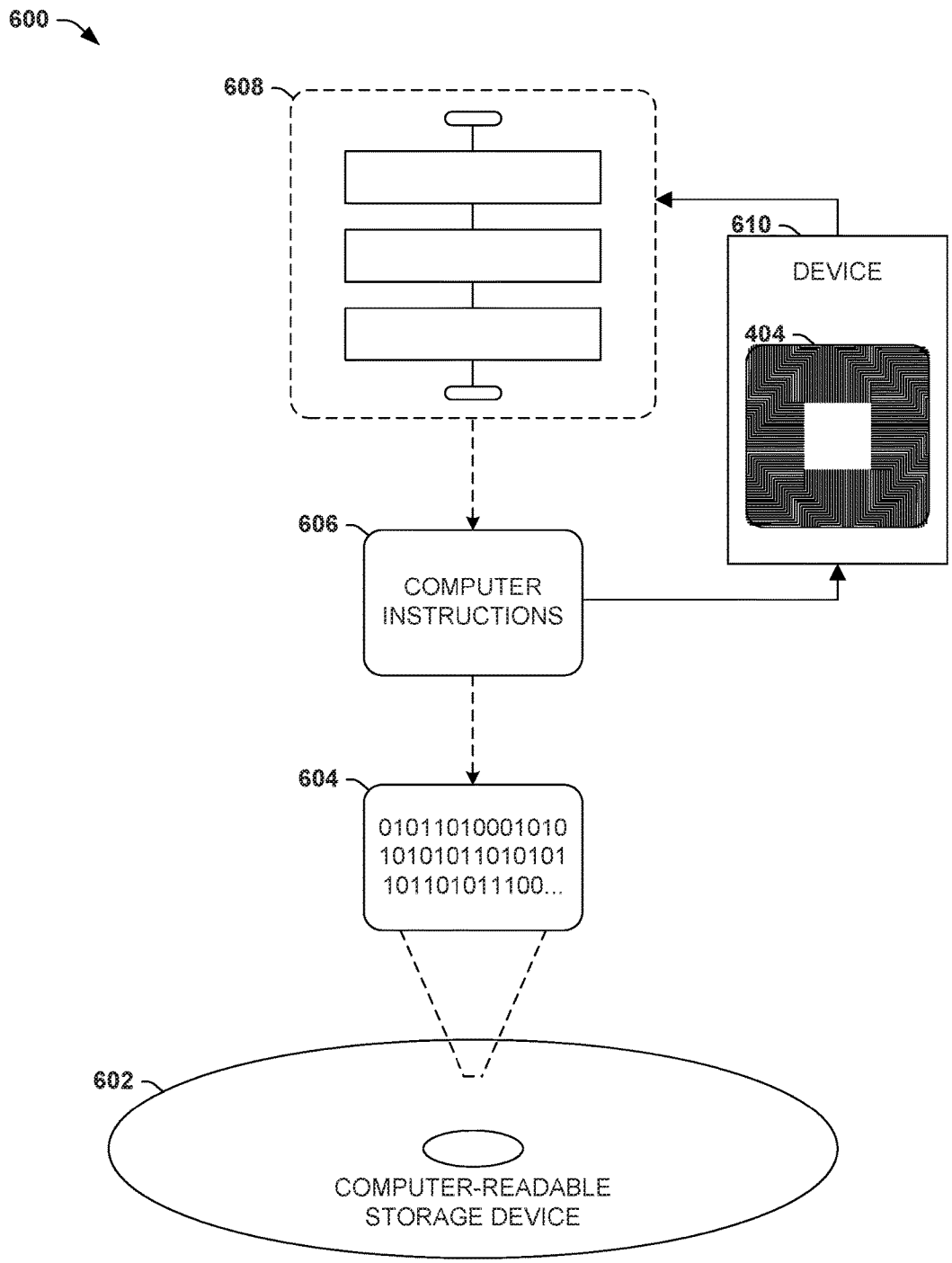
FIG. 6 is an illustration of an example computer-readable storage device storing instructions that cause a device to in accordance with the techniques presented herein.

An example computer-readable medium that may be devised in these ways is illustrated in FIG. 6, wherein the implementation 600 comprises a computer-readable memory device 602 (e.g., a CD-R, DVD-R, or a platter of a hard disk drive), on which is encoded computer-readable data 604. This computer-readable data 604 in turn comprises a set of computer instructions 606 that, when executed on a processor 404 of a device 610, cause the device 610 to operate according to the principles set forth herein. In a first such embodiment, the processor-executable instructions 606 may enable a configuration of a device to destroy objects 102 using an object destruction workflow 202 in accordance with the techniques presented herein, such as the example device 402 in the example scenario 400 of FIG. 4. In a first such embodiment, the processor-executable instructions 606 may provide a system that, when executed by a device, causes the device to destroy objects 102 using an object destruction workflow 202 in accordance with the techniques presented herein, such as the example system 408 in the example scenario 400 of FIG. 4. In a third such embodiment, the processor-executable instructions 606 of the computer-readable storage device 602 may provide a method 608 of causing a device to destroy objects 102 using an object destruction workflow 202 in accordance with the techniques presented herein, such as the example method 500 of FIG. 5. Many such computer-readable media may be devised by those of ordinary skill in the art that are configured to operate in accordance with the techniques presented herein.

E. Variations

The techniques discussed herein may be devised with variations in many aspects, and some variations may present additional advantages and/or reduce disadvantages with respect to other variations of these and other techniques.

Moreover, some variations may be implemented in combination, and some combinations may feature additional advantages and/or reduced disadvantages through synergistic cooperation. The variations may be incorporated in various embodiments (e.g., the example device 400 and/or the example system 408 of FIG. 4; the example method 500 of FIG. 5; and/or the example computer-readable storage device 602 of FIG. 6) to confer individual and/or synergistic advantages upon such embodiments.

E1. Scenarios

A first aspect that may vary among embodiments of the techniques presented herein relates to the range of scenarios in which such techniques may be utilized.

As a first variation of this first aspect, the techniques presented herein may be utilized with a variety of devices, such as workstations; laptops; tablets; mobile phones; game consoles and portable gaming devices; portable or non-portable media players; media display devices such as televisions, appliances; home appliance and automation devices; and computing components integrated with a wearable device integrating such as eyewear or a watch.

As a second variation of this first aspect, the techniques presented herein may be utilized with a variety of threads 106, such as GUI-driven, console-driven, and/or UI-less applications; services and daemons; device drivers; and actual or virtualized operating system processes, such as kernel processes and file system processes. Various threading and thread scheduling models may be compatible with the techniques presented herein. The threads 106 may execute within various types of execution environments 108, such as native execution environments 108 provided in a machine language and executed directly by the processor 404; managed applications that are executed by a runtime within a particular runtime environment; virtualized applications that execute within a virtual machine, such as a web browser; and scripts executed by an interpreter. Additionally, many types of objects 102 and object resources 104 may be managed and in particular destroyed by the techniques presented herein, including lightweight collections of untyped and/or lightly-typed objects (e.g., key/value stores, such as JSON objects) and heavily organized and typed objects (e.g., a deep hierarchy of class-based objects with inheritance and polymorphic typing). The object destruction workflow 202 may also be invoked to destroy any object 102 within the computing environment of the device 402; only for objects 102 for which object destruction presents a complexity, such as objects 102 that are shared by multiple threads 106 and/or execution environments 108; and/or only for objects 102 for which a thread 106 has attempted to initiate and complete an object destruction process, and has encountered a failure 118.

As a third variation of this first aspect, many types of object destruction workflows 202 may be utilized. As a first such example, Workflow patterns are often utilized for many types of tasks in various computing environments, and many such workflows are applied to resource-intensive and computationally expensive processes, such as the intricate steps involved in completing a database transaction. The object destruction workflow 202 presented herein is utilized as a pattern for organizing the destruction of objects 102, and may be suitable for a wide variety of objects 102, including comparatively lightweight objects that are typically destroyable in response to a single object destruction request 114 (but which may encounter complications in unusual situations, such as exclusive locking by a different thread 106), and complex objects 102 storing a robust set of object resources 104 with detailed task criteria 304, such as illustrated in the example scenario 300 of FIG. 3. A generalized object destruction workflow 202 may also scale to facilitate the destruction of a wide range of such objects 102, e.g., an entire set of objects 102 utilized by a robust application, where such objects 102 include both lightweight objects 102 that are typically easy to destroy and complex objects 102 presenting extensive task criteria 304 in the destruction thereof. The techniques presented herein may be suitable for use with a wide range of object types and complexity.

As a second such example, the object destruction workflow 202 may comprise a component of the operating system of a device 402; a component of one or more runtimes provided by a platform or architectural feature of such a device 402; and/or a runtime library installed on the device 402, which may be accessible to all threads 106 for the destruction of any objects 102, and/or may be provided for a specific collection of threads 106 and/or objects 102 (e.g., a web browser component that facilitates the object destruction of objects 102 utilized by web applications). The object destruction workflow 202 may also facilitate a distributed set of threads 106 executing upon a collection of devices 402, such as a collection of threads 106 distributed over a set of servers comprising a server farm, and/or may be invoked to manage the object destruction of objects 102 distributed over a variety of devices, such as a shared collection of objects stored and/or utilized by a variety of object servers.

As a third such example, the object destruction workflow 202 may be embedded within one or more objects 102 that are managed by the object destruction workflow 202; conversely, the object destruction workflow 202 may encapsulate the objects 102 managed thereby; and/or the object destruction workflow 202 and objects 102 may exist independently, and/or within a shared context, such as a runtime environment of one or more threads 106. As a fourth such example, the relationship and/or interface between the threads 106 and the object destruction workflow 202 may be defined in various ways. For example, the object destruction workflow 202 may comprise a manager that handles object destruction of object on behalf of the threads 106; as a service that the threads 106 may invoke to assist with object destruction of objects 102; and/or as a script, resource kit, or library of functions that the threads 106 may refer to and/or utilize to perform individual tasks 302 of the object destruction of one or more objects 102. The threads 106 may also delegate various functions to the object destruction workflow 202; e.g., a thread 106 and/or execution environment 108 may expose a lambda expression, function, or callback that the object destruction workflow 202 may invoke in order to request the participation of the thread 106 in the tasks 302 involved in the object destruction of an object 102.

As a fourth variation of this first aspect, many types of the object destruction lists 212 may be utilized. As a first such example, the object destruction list 212 may be implemented as many types of data structures, including an array; a linked list; a queue; an unordered set; a table, such as a hashtable; and a tree structure. As a second such example, the object destruction list 212 may be implemented as a global object destruction list 212 that stores last references 206 to any object 102 of the computing environment that is to be destroyed. Alternatively, one or more object destruction lists 212 may be provided, where each object destruction list 212 stores last references 206 to objects 102 of a particular type, such as objects 102 of a particular object type, and/or objects 102 utilized within a selected context; objects 102 utilized by selected threads 106, such as the threads 106 of a particular programming language and/or execution environment 108; and/or for objects 102 storing a particular set of object resources 104, such as object resources 104 of a particular object resource type 104. As a third such example, the object destruction list 212 may store various types of last references 206, such as a memory pointer to a location where the identified object 102 is stored, or a unique identifier of the object 102, such as a globally unique identifier (GUID) and/or a uniform resource identifier (URI) of the object 102. Alternatively or additionally, the object destruction list 212 may store references 206 to particular object resources 104 that are to be destroyed in the course of destroying one or more objects 102 that include and/or reference such object resources 104. Many such computing scenarios variations and architectural variations may be suitable for the use of an object destruction workflow 202 to facilitate the destruction of objects 102 in accordance with the techniques presented herein.

E2. Object Destruction Workflow

A second aspect that may vary among embodiments of the techniques presented herein relates to the object destruction workflow 202 that is utilized by the threads 106 to achieve an object destruction of various objects 102 of the computing environment.

As a first variation of this second aspect, the object destruction workflow 202 may be generated ad hoc in order to handle an object destruction of a particular object 102, and/or to handle the destruction of objects 102 by a particular thread 106. Alternatively, the object destruction workflow 202 may be generated to handle the destruction of any object 102 of within the computing environment on behalf of any thread 106, or to handle a particular subset of objects 102 that are utilized by a particular subset of threads 106. As one such example, the computing environment may feature a context involving a collection of threads 106 that interoperate over a particular set of objects 102, such as the threads 106 and objects 102 involved in a particular service, platform, library, and/or application. Additionally, the object destruction workflow 202 may contain various types of information about the object 102 and/or the threads 106 involved in the object destruction of the object(s) 102. As one such example, the object destruction workflow may identify, for a particular object 102, a set of threads 106 that has accessed and/or that may access a particular object 102. The storage of such information may enable the object destruction workflow 202 to issue notification regarding the destruction of a particular object 102 specifically to the threads 106 that have accessed and/or may access the object 102, e.g., in order to inform them of the progress of the object destruction of the object 102 and/or to request the participation of such threads 106 in the object destruction. Additionally, the object destruction workflow 202 may include various types of information destruction processes that may be applicable to various objects 102, such as the tasks 302 involved in the destruction of the object 102, the task criteria 304 applicable thereto, and/or the status 306 of the respective tasks 302 in the object destruction.

As a second variation of this second aspect, the object destruction of an object 102 by the object destruction workflow 202 may be initiated in various ways. As a first such example, a thread 106 may initiate an explicit object destruction request 114, such as invoking a disposal instruction or disposal interface to dispose of the object 102. As a second such example, a thread 106 may initiate an implicit object destruction request 114, such as releasing a reference 206 to the object 102 that happens to comprise the last reference 206 to the object and that prompts the decrementing of a reference count 204 from one to zero, or closing a scope of the thread 106 that contains the last reference 206 to the object 102. As a third such example, a thread 106 may self-terminate, and/or may be terminated by another thread 106, and the termination of the thread 106 may include releasing a last reference 206 to the object 102 that was held by the thread 106.

As a third variation of this second aspect, the object destruction workflow 202, while performing an object destruction of an object 102 on behalf of a first thread 106 that initiated the object destruction request 114, may encounter many types of obstacles that prevent a completion of the object destruction on behalf of the first thread 106. As a first such example, the object destruction workflow 202 may discover that a selected portion of the object 102 is associated with an object destruction process of a second thread 106 (e.g., an object destruction convention utilized by an execution environment 108 of the second thread 106, such as a convention of the programming language and/or platform of the second thread 106), and may encounter a failure 118 upon determining that the selected portion of the object 102 is associated with the object destruction process to be invoked within the second thread 106. As a second such example, the object destruction workflow 202 may discover that an object resource 104 of the object 102 is exclusively held by a different thread 106 via an object resource lock 112 that neither the first thread 106 nor the object destruction workflow 202 is capable of interrupting. As a third such example, the object destruction workflow 202 may determine that an object resource 104 of the object 102 is in a busy state (e.g., a device handle that is performing an uninterruptible process using an external device, where destruction of the object resource 104 during the uninterruptible process may result in data corruption or damage to the external device). As a fourth such example, the object destruction workflow 202 may simply find that the first thread 106 initiating the object discussion request 114 does not have permission to destroy the object 102. Many such obstacles may arise during the object destruction by the object destruction workflow 202.

Figure 7:
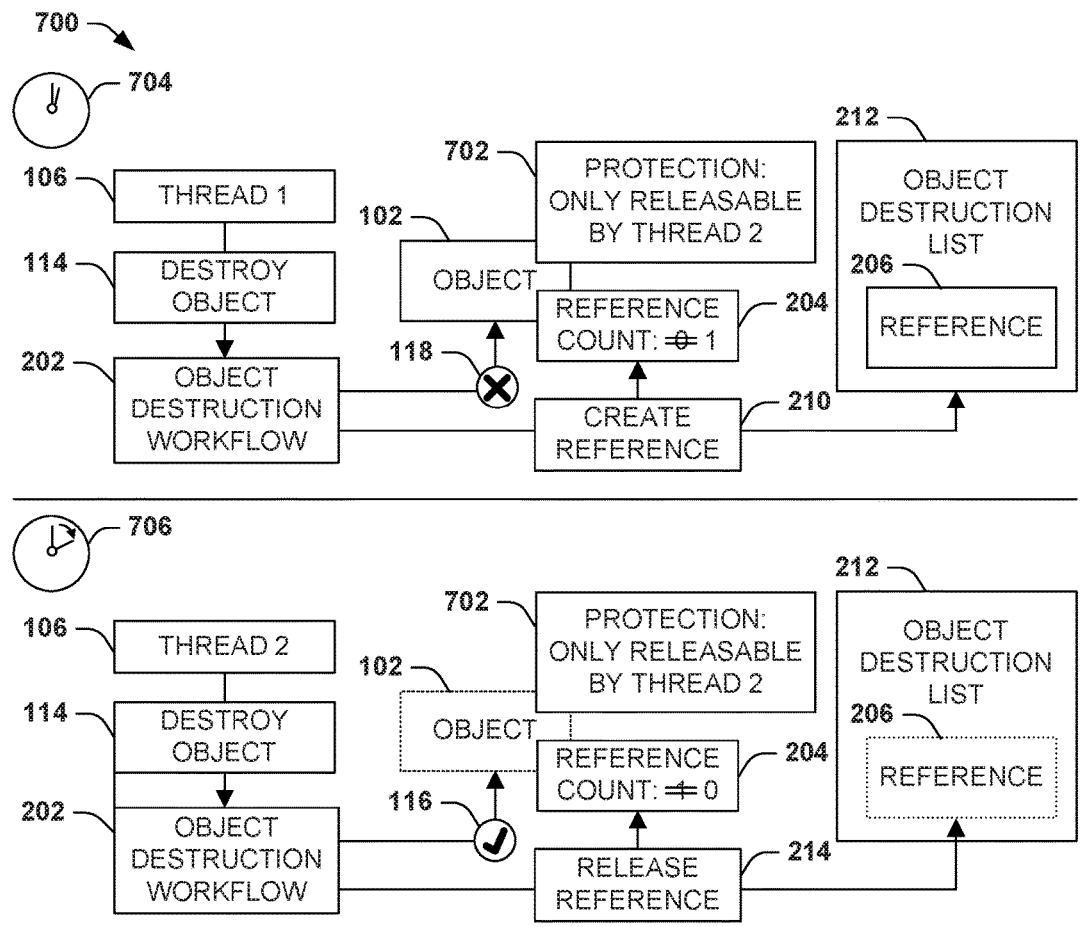
FIG. 7 is an illustration of an example scenario featuring a protection of an object that various threads endeavor to destroy via an object destruction workflow in accordance with the techniques presented herein.

FIG. 7 is an illustration of an example scenario 700 featuring a fourth variation of this second aspect, wherein the object destruction workflow 202 permits an object 102 to be marked as a protected object that is destroyable only by a selected thread 106, and wherein the object destruction workflow 202 refuses object destruction requests 114 initiated by any other thread 106. In this example scenario 700, a particular object 102 is marked 702 as a protected object that may only be destroyed upon the request of a second thread 106. At a first time 704, a first thread 106 initiates an object destruction request 114, e.g., by attempting to decrement the reference count 204 from one to zero. However, the object destruction workflow 202 determines that the object 102 is marked to prevent object destruction by the first thread 106, and therefore refuses the object destruction request 114 of the first thread 106 (including refusing to allow the first thread 106 to decrement the reference count 204 from one to zero, and/or to perform a reference release 214 of the last reference 206 in the object destruction list 212), and returns a failure 118 of the object destruction request 114 to the first thread 106. At a second time 706, the object destruction workflow 202 receives an object destruction request 202 from the second thread 106, and verifies that the marking 702 of the object 102 permits the second thread 106 to initiate object destruction. The object destruction workflow 202 therefore performs a reference release 214 of the last reference 206 in the object destruction list 212, decrements the reference count 204 from one to zero, and reports a success 116 of at least initiating the object destruction request 114 of the object 102.

Figure 8:
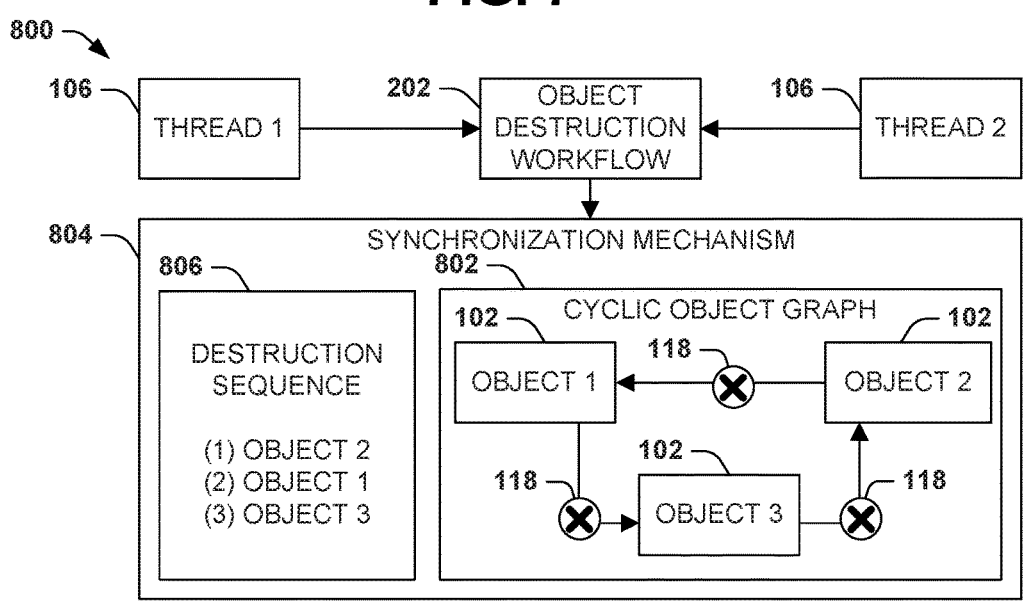
FIG. 8 is an illustration of an example scenario featuring a destruction mechanism of an object graph by an object destruction workflow in accordance with the techniques presented herein.

FIG. 8 presents an illustration of an example scenario 800 featuring a fifth variation of this second aspect, involving a cyclic object graph 802 of objects 102 that respectively contain references 206 to other objects 102 of the object graph 802, forming a reference cycle. When the object destruction workflow 202 receives, from a thread 106, an object destruction request 114 to destroy an object 102 of the cyclic object graph 802, the object destruction workflow 202 may encounter a difficulty, in that none of the objects 102 is capable of being fully destroyed without first destroying one or more other objects 102 of the cyclic object graph 802 that stores a reference 206 to the object 102 identified in the object destruction request 114. The entire set of objects 102 comprising the cyclic object graph 802 may therefore persist beyond the lifecycle of any or all of the objects 102 due to the interrelationships of the objects 102. In order to address this issue, the object destruction workflow 202 may provide a synchronization mechanism 804 over the entire set of objects 102 of the cyclic object graph 802 (e.g., an exclusive lock over all of the objects 102). Upon receiving an object destruction request 114 to destroy one, several, or all of the objects of the cyclic object graph 802, the object destruction workflow 202 may first secure exclusive access to the objects 102 of the cyclic object graph 802 via the synchronization mechanism 804. The object destruction workflow 202 may then initiate the object destruction of the objects 102 according to a destruction sequence 806 (e.g., destroying the objects 102 in a specific order). Notably, the object destruction of each object 102 may be performed irrespective of the references 206 to the object 102 held by other objects 102 of the cyclic object graph 802, because the synchronization mechanism 804 held by the object destruction workflow 202 precludes any other threads 106 from accessing the objects 102 and potentially encountering an invalid reference 206 to a previously destroyed object 102. The object destruction workflow 202 may retain the synchronization mechanism 804 until the destruction sequence 806 over the cyclic object graph 802 is complete and all such objects 102 have been destroyed, thereby enabling the destruction of the cyclic object graph 802.

Figure 9:
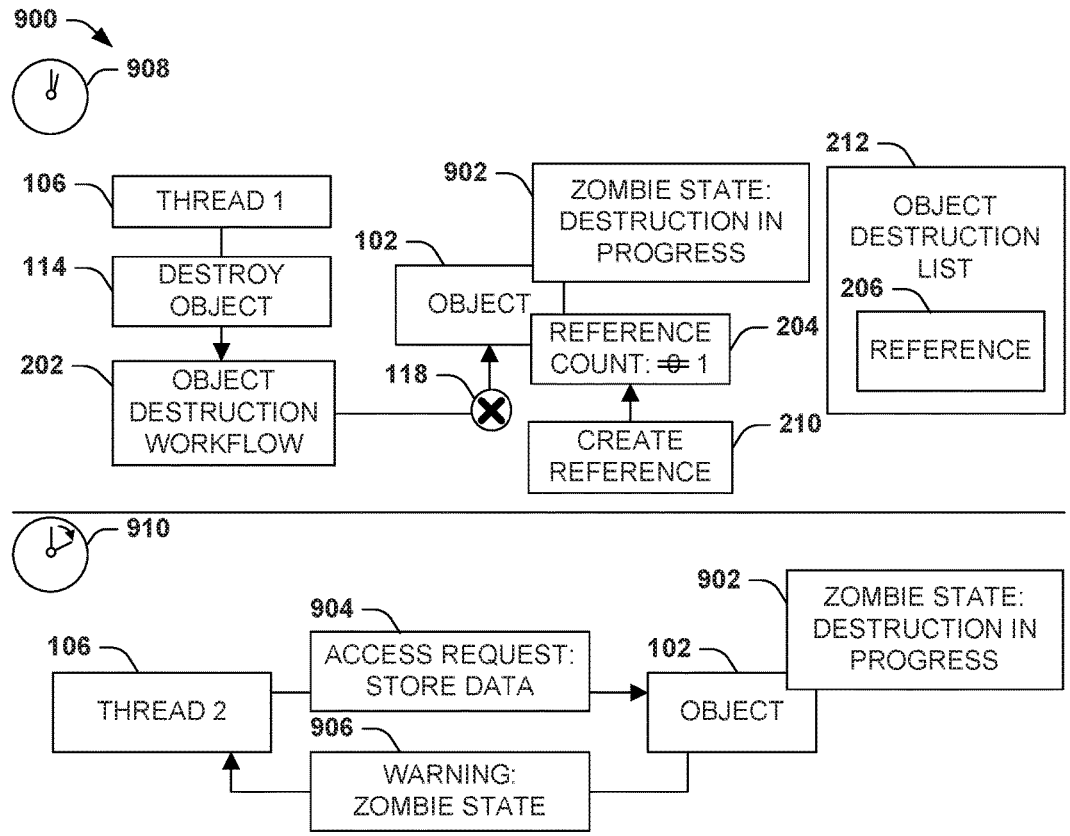
FIG. 9 is an illustration of an example scenario featuring marking of an object as a zombie state, during a destruction of the object by an object destruction workflow, in accordance with the techniques presented herein.

FIG. 9 presents an illustration of an example scenario 900 featuring a sixth variation of this second aspect, wherein the object destruction workflow 202 marks objects 102 for which object destruction has been initiated, but not yet completed, as marked with a zombie state 902. In this example scenario 900, at a first time 908, a first thread 106 initiates an object destruction request 114 to destroy a particular object 102, and the object destruction workflow 202 initiates the object destruction 102. While initiating the object destruction, the object destruction workflow 202 may apply to the object 102 a marking of a zombie state 902, indicating to other threads 106 that object destruction of the object 102 is in progress. Responsive to encountering a failure 118 to complete the object destruction of the object 102, the object destruction workflow 202 performs a reference creation 210, adds a new reference 206 to the object 102 to an object destruction list 212 as the last reference 206 to the object 102, and increments a reference count 204 from zero to one. The object destruction workflow 202 then waits for another thread 106 to resume the object destruction process. However, at a second time 910 before such object destruction is complete, a second thread 106 may initiate an access request 904 over the object 102, such as a request to store data in the object 102. The marking of the object 102 as a zombie state 902 may result in the generation of a warning 906 to the second thread 106 indicating the zombie state 902 of the object 102, and warning that data read from and/or written to the object 102 may not be accurate, current, and/or valid, and/or may be lost during the object destruction. In this manner, the object destruction workflow 202 safeguards the object 102 from access by other threads 106 during the pendency of the object destruction, and the reduction of exceptions, inconsistent behavior, and/or data loss that may result from threads 106 inadvertently accessing the object 102 during the object destruction. Many such techniques may be utilized by the object destruction workflow 202 to perform the object destruction of the objects 102 in accordance with the techniques presented herein.

E3. Object Destruction List

A third aspect that may vary among embodiments of the techniques presented herein involves the use of the object destruction list 212 by the object destruction workflow 202 to store references 206 to the objects 102 to be destroyed (and, more specifically, for which at least one thread 106 has initiated an object destruction request 114 that resulted in a failure 118).

Figure 10:
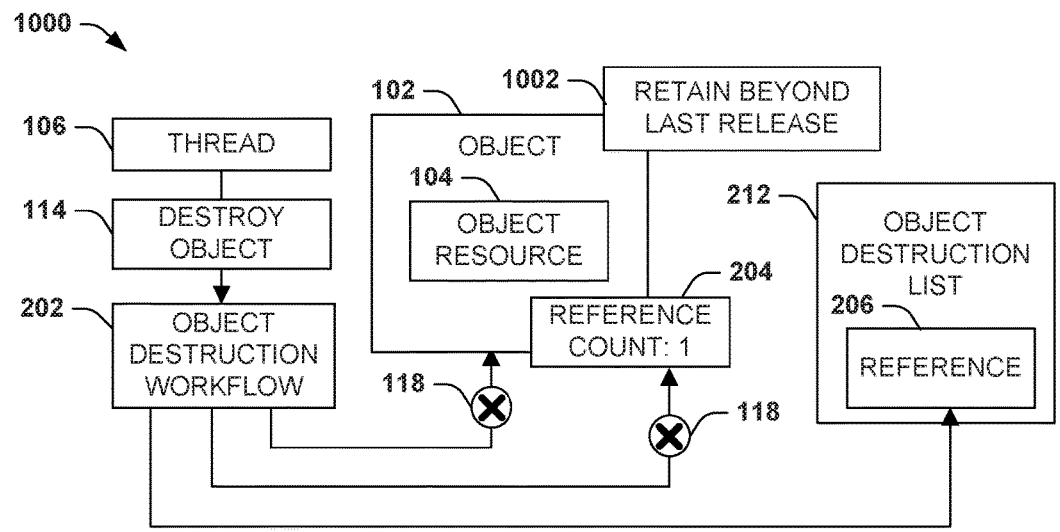
FIG. 10 is an illustration of an example scenario featuring a retention of an object by an object destruction workflow in accordance with the techniques presented herein.

FIG. 10 is an illustration of an exemplary scenario 1000 featuring a first variation of this second aspect, wherein the object destruction workflow 202 enables an object 102 to be marked with a retain status 1002, such that the object 102 is to be retained even beyond a reference release 214 of the last reference in any thread 106. For example, the object 102 may comprise an instance of a runtime library or service that is to remain available to threads 106 of the computing environment, even while no threads 106 are currently using the object 102. In this example scenario 1000, a thread 106 that stores a last reference 206 to the object 102 initiates an object destruction request 114 to release the last reference 206, decrement the reference count 204 from one to zero, and destroy the object 102. However, the object destruction workflow 202 identifies the object 102 as having been marked as a retained object 1002, for which a last reference 206 is to be retained rather than released. The object destruction workflow 202 may therefore report a failure 118 to decrement the reference count 204, release the last reference 206, and/or destroy the object 102. Instead, the object destruction workflow 202 may store the last reference 206 in the object destruction list 212, yet may refuse requests by various threads 106 to release the last reference 206 and/or decrement the reference count 204 from one to zero. The object destruction flow 202 therefore uses the object destruction list 212 as a retained object cache that stores a cached reference 206 to the retained object 102, thereby ensuring that the object 102 is not destroyed while retaining the marking as a retained object 1002. Moreover, while the retained object cache stores the cached reference 206 to the retained object 1002, other references 206 to the retained object 1002 within the respective threads are marked as a weak reference to the retained object 1002, and are not tracked by the reference count 204. Responsive to a request to remove the marking of the object 102 as a retained object 1002, the object destruction workflow 202 may change any references 206 within the threads 106 to strong references 206 (and may increment the reference count 204 accordingly), such that the release of all such references 204 invokes the object destruction of the object 102.

As a second variation of this third aspect, the threads 106 and the object destruction workflow 202 may interact in various ways to communicate about the object destruction list 212, including the addition of a reference 206 to an object 102 to the object destruction list 212 for which various threads 106 may initiate an object destruction request 114.

Figure 11:
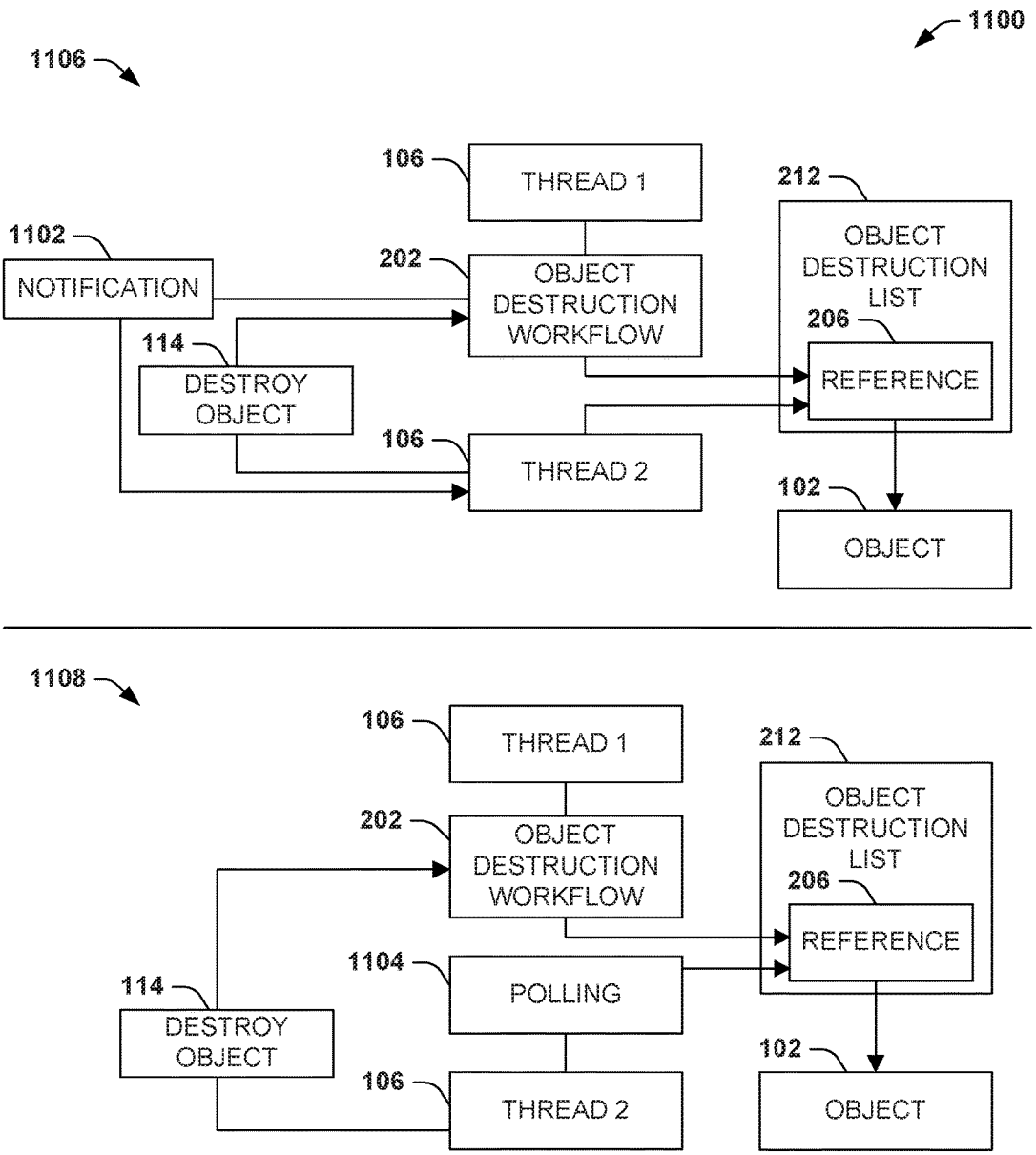
FIG. 11 is an illustration of an example scenario featuring various mechanisms whereby a second thread resumes an object destruction process previously initiated by a first thread in accordance with the techniques presented herein.

FIG. 11 presents an illustration of an exemplary scenario 1100 featuring two such techniques whereby the threads 106 and the object destruction workflow 202 utilize the object destruction list 212 to coordinate the object destruction of an object 102. As a first such example 1106, a first thread 106 may initiate an object destruction request 114, during which the object destruction workflow 202 may encounter a failure 118, prompting the object destruction workflow 202 to add a new reference 206 to the object destruction list 212 as a last reference to the object 102. Additionally, responsive to adding the new reference 206 to the object 102 to the object destruction list 212, the object destruction workflow 202 may further notify a second thread 106 that also accesses the object 102 about the addition of the new reference 206 to the object 102 to the object destruction list 212. The notification 1102 may prompt the second thread 106 to release the last reference 206, thereby prompting the object destruction workflow 202 to reinitiate the object destruction process on behalf of the second thread 106.

In this variation, many techniques may be utilized whereby the object destruction workflow 202 identifies the second thread 106 as a recipient of the notification 1102. As a first such example, the notification 1102 may also initiated by the object destruction workflow 202, and/or by the object destruction list 212 upon receiving the last reference 206 to the object 102. As a second such example, the second thread 106 may further comprise a superior thread 106 that is superior to the first thread 106, and that shares accesses to the object 106 (e.g., a thread of a managing runtime that manages the first thread 106), and the object destruction workflow 202 may notify the superior thread 106 of the addition of the new reference 206 to the object 102 to the object destruction list 212. As a third such example, the object destruction workflow 202 may search among a thread collection of threads 106 that are executed by the processor to identify the second thread as one of several threads that has access to, and/or is currently accessing or has previously accessed, the object 102. As a fourth such example, the notification 1102 may be delivered to the second thread 106 in a variety of ways. For instance, the second thread 106 may further comprise a message queue of messages that are to be delivered to the second thread 106, and the object destruction workflow 202 may insert the notification 1102 into the message queue of the second thread 106, wherein the message notifies the second thread 106 of the addition of the new reference 206 to the object 102 to the object destruction list 212. As a fifth such example, if the second thread 106 to which the notification 1102 is to be delivered is in a suspended state, the object destruction workflow 202 may activate the second thread 106 to process the notification 1102 and to continue the object destruction of the object 102.

FIG. 11 also illustrates a second example 1108 of an interaction between the threads 106 and the object destruction list 212, wherein the respective threads 106 periodically review the object destruction list 212 to identify the presence of references 206 to objects 102 that are currently and/or have been accessed by the thread 106. In this second example 1108, a first thread 106 may initiate an object destruction request 114, during which the object destruction workflow 202 may encounter a failure 118, prompting the object destruction workflow 202 to add a new reference 206 to the object destruction list 212 as a last reference to the object 102. A second thread 106 may poll 1104 the object destruction list 212, and upon discovering the last reference 206 to the object 102, may determine whether the object 102 is currently and/or has been accessed by the second thread 102. Responsive to determining that the second thread 106 has such a relationship with the object 102, the second thread 106 may remove the last reference 206 to the object 102 from the object destruction list 212 and perform a reference release 214 of the last reference 206, thereby initiating a resumption of the object destruction workflow 202 on behalf of the second thread 106. Many such techniques may be utilized by the threads 106 and the object destruction workflow 202 to communicate thereamong about the object destruction processing of the objects 102 in accordance with the techniques presented herein.

F. Computing Environment

Figure 12:
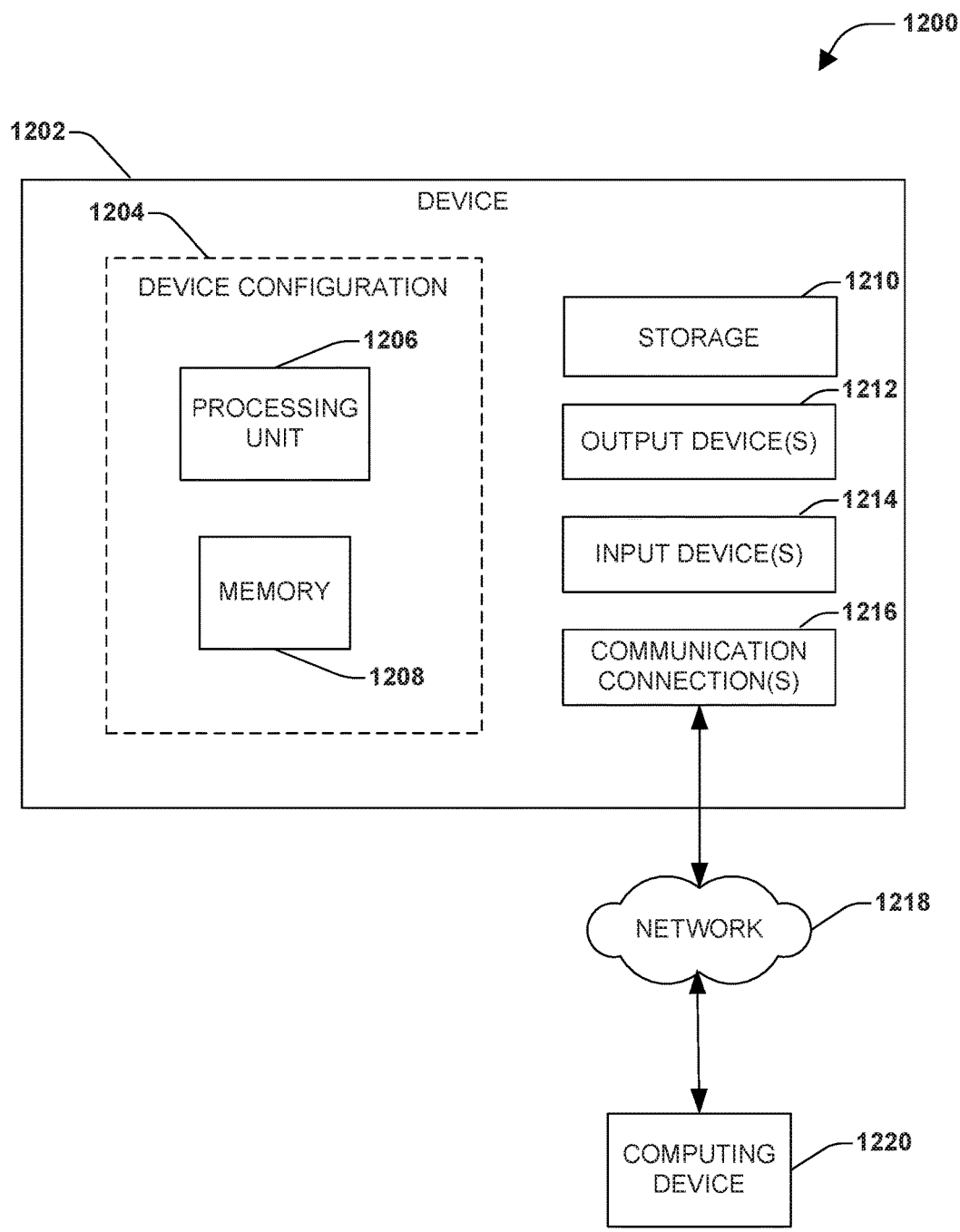
FIG. 12 is an illustration of an example computing environment wherein one or more of the provisions set forth herein may be implemented.

FIG. 12 and the following discussion provide a brief, general description of a suitable computing environment to implement embodiments of one or more of the provisions set forth herein. The operating environment of FIG. 12 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 12 illustrates an example of a system 1200 comprising a computing device 1202 configured to implement one or more embodiments provided herein. In one configuration, computing device 1202 includes at least one processing unit 1206 and memory 1208. Depending on the exact configuration and type of computing device, memory 1208 may be volatile (such as RAM, for example), non-volatile (such as ROM, flash memory, etc., for example) or some combination of the two. This configuration is illustrated in FIG. 12 by dashed line 1204.

In other embodiments, device 1202 may include additional features and/or functionality. For example, device 1202 may also include additional storage (e.g., removable and/or non-removable) including, but not limited to, magnetic storage, optical storage, and the like. Such additional storage is illustrated in FIG. 12 by storage 1210. In one embodiment, computer readable instructions to implement one or more embodiments provided herein may be in storage 1210. Storage 1210 may also store other computer readable instructions to implement an operating system, an application program, and the like. Computer readable instructions may be loaded in memory 1208 for execution by processing unit 1206, for example.

The term "computer readable media" as used herein includes computer-readable memory devices that exclude other forms of computer-readable media comprising communications media, such as signals. Such computer-readable memory devices may be volatile and/or nonvolatile, removable and/or non-removable, and may involve various types of physical devices storing computer readable instructions or other data. Memory 1208 and storage 1210 are examples of computer storage media. Computer-storage storage devices include, but are not limited to, RAM, ROM, EEPROM, flash memory or other memory technology, CD-ROM, Digital Versatile Disks (DVDs) or other optical storage, magnetic cassettes, magnetic tape, and magnetic disk storage or other magnetic storage devices.

Device 1202 may also include communication connection(s) 1216 that allows device 1202 to communicate with other devices. Communication connection(s) 1216 may include, but is not limited to, a modem, a Network Interface Card (NIC), an integrated network interface, a radio frequency transmitter/receiver, an infrared port, a USB connection, or other interfaces for connecting computing device 1202 to other computing devices. Communication connection(s) 1216 may include a wired connection or a wireless connection. Communication connection(s) 1216 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1202 may include input device(s) 1214 such as keyboard, mouse, pen, voice input device, touch input device, infrared cameras, video input devices, and/or any other input device. Output device(s) 1212 such as one or more displays, speakers, printers, and/or any other output device may also be included in device 1202. Input device(s) 1214 and output device(s) 1212 may be connected to device 1202 via a wired connection, wireless connection, or any combination thereof. In one embodiment, an input device or an output device from another computing device may be used as input device(s) 1214 or output device(s) 1212 for computing device 1202.

Components of computing device 1202 may be connected by various interconnects, such as a bus. Such interconnects may include a Peripheral Component Interconnect (PCI), such as PCI Express, a Universal Serial Bus (USB), Firewire (IEEE 1394), an optical bus structure, and the like. In another embodiment, components of computing device 1202 may be interconnected by a network. For example, memory 1208 may be comprised of multiple physical memory units located in different physical locations interconnected by a network.

Those skilled in the art will realize that storage devices utilized to store computer readable instructions may be distributed across a network. For example, a computing device 1220 accessible via network 1218 may store computer readable instructions to implement one or more embodiments provided herein. Computing device 1202 may access computing device 1220 and download a part or all of the computer readable instructions for execution. Alternatively, computing device 1202 may download pieces of the computer readable instructions, as needed, or some instructions may be executed at computing device 1202 and some at computing device 1220.

G. Usage of Terms

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Any aspect or design described herein as an "example" is not necessarily to be construed as advantageous over other aspects or designs. Rather, use of the word "example" is intended to present one possible aspect and/or implementation that may pertain to the techniques presented herein. Such examples are not necessary for such techniques or intended to be limiting. Various embodiments of such techniques may include such an example, alone or in combination with other features, and/or may vary and/or omit the illustrated example.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

The invention claimed is:

1. A device that destroys objects within a reference-counting environment of the device, the device comprising:
   a processor, and
   a memory storing:
      an object destruction list of references to objects to be destroyed; and
      an object destruction workflow executed by the processor on behalf of a first thread that:
         responsive to releasing a last reference to an object accessed by the first thread:
            attempts to destroy the object; and
            responsive to failing to complete destruction of the object, adds a new reference to the object to the object destruction list, as the last reference to the object; and
         responsive to identifying, for the object, the last reference to the object added to the object destruction list by a second thread, releases the last reference to the object.

2. The device of claim 1, wherein:
   a selected portion of the object is associated with an object destruction process of the second thread; and
   failing to complete the destruction of the object further comprises: determining that the selected portion is associated with the object destruction process to be invoked within the second thread.

3. The device of claim 1, wherein:
   a selected portion of the object is exclusively reserved by a thread other than the first thread; and
   failing to complete the destruction of the object further comprises: determining that the selected portion of the object is exclusively reserved by a thread other than the first thread.

4. The device of claim 1, wherein the object destruction workflow further comprises:
   a set of tasks to be performed to destroy the object; and
   for respective tasks:
      a task criterion of the task; and
      a status of the task.

5. The device of claim 1, wherein:
   the object destruction workflow, responsive to initiating object destruction of an object, marks the object with a zombie state; and
   the object, responsive to a second thread accessing the object while marked as a zombie state, returns to the second thread a warning indicating a zombie state of the object.

6. The device of claim 1, wherein:
   the device further stores an object set of objects comprising a cyclic object graph; and
   the object destruction workflow, responsive to attempting to destroy the object:
      identifies the object as a member of the object set of objects comprising the cyclic object graph;
      invokes a synchronization mechanism to obtain exclusive access to the object set of the cyclic object graph;
      while retaining the exclusive access of the synchronization mechanism, destroys the objects of the object set according to a destruction sequence; and
      responsive to destroying all of the objects of the cyclic object graph, releasing the exclusive access of the synchronization mechanism.

7. The device of claim 6, wherein attempting to destroy the object further comprises:
   determining that the object is marked as a protected object that is destroyable only by a selected thread other than the first thread; and
   responsive to the determining, refusing to destroy the object.

8. A method of destroying objects within a reference-counting environment of a device comprising a processor, the method comprising:
   executing, on the processor, an object destruction workflow that:
      generates an object destruction list of references to objects to be destroyed; and
      on behalf of a first thread and responsive to releasing a last reference to an object accessed by the first thread:
         attempts to destroy the object; and
         responsive to failing to complete destruction of the object, adds a new reference to the object to the object destruction list as the last reference to the object, wherein inclusion of the last reference to the object in the object destruction list prompts other threads accessing the object to attempt to destroy the object.

9. The method of claim 8, wherein the object destruction workflow, responsive to adding the new reference to the object to the object destruction list, notifies a second thread that also accesses the object of the addition of the new reference to the object to the object destruction list as the last reference to the object.

10. The method of claim 9, wherein:
    the second thread further comprises a superior thread that is superior to the first thread, and that shares accesses to the object; and
    notifying the second thread further comprises: notifying the superior thread of the addition of the new reference to the object to the object destruction list as the last reference to the object.

11. The method of claim 9, wherein notifying the second thread further comprises: searching among a thread collection of threads executed by the processor to identify the second thread to also accesses the object.

12. The method of claim 9, wherein:
the second thread further comprises a message queue of messages to be delivered to the second thread; and
notifying the second thread further comprises: inserting, into the message queue of the second thread, a message notifying the second thread of the addition of the new reference to the object to the object destruction list as the last reference to the object.

13. The method of claim 8, wherein the object destruction workflow:
polls the object destruction list to identify the last reference to objects that are accessed by the first thread; and
responsive to finding the last reference to the object in the object destruction list:
removes the last reference to the object from the object destruction list; and
releases the last reference to the object.

14. The method of claim 8, wherein the object destruction list, responsive to receiving the last reference to the object to the object destruction list, notifies a second thread of the addition of the new reference to the object to the object destruction list as the last reference to the object.

15. The method of claim 14, wherein notifying the second thread further comprises: responsive to identifying a suspended state of the second thread, activating the second thread to process the last reference to the object in the object destruction list.

16. The method of claim 8, wherein releasing the last reference to the object further comprises: periodically reviewing the object destruction list to identify an object that is accessed by the thread.

17. A device that destroys objects within a reference-counting environment of the device, the device comprising:
a processor; and
a memory storing:
an object destruction list of references to objects to be destroyed; and
an object destruction workflow comprising instructions that, when executed by the processor, cause the device to respond to a first thread releasing a last reference to an object accessed by the thread:
attempting to destroy the object; and
responsive to failing to complete destruction of the object, adding a new reference to the object to the object destruction list as the last reference to the object,
wherein inclusion of the last reference to the object in the object destruction list prompts other threads accessing the object to attempt to destroy the object.

18. The device of claim 17, wherein:
the memory further stores a context session object set of objects that are utilized within a context session; and
the object destruction list is associated with the context session to store last references to the objects of the context session object set of the context session.

19. The device of claim 17, wherein:
the object is a retained object that is to be retained upon the first thread releasing the last reference to the object; and
the memory further comprises: a retained object cache that stores a cached reference to the object outside of the first thread and a second thread.

20. The device of claim 19, wherein:
while the retained object cache stores the cached reference to the retained object, other references to the retained object within respective threads are marked as a weak reference to the retained object; and
the object destruction workflow, responsive to removing the cached reference to the retained object, changes the weak references to the retained object in the respective threads to a strong reference.

* * * * *